United States Patent [19]

Best et al.

[11] Patent Number: 4,916,400

[45] Date of Patent: Apr. 10, 1990

[54] METHOD FOR DETERMINING CHARACTERISTICS OF THE INTERIOR GEOMETRY OF A WELLBORE

[75] Inventors: David L. Best, Houston; Brian Clark, Missouri City, both of Tex.

[73] Assignee: Schlumberger Technology Corporation, Sugar Land, Tex.

[21] Appl. No.: 319,013

[22] Filed: Mar. 3, 1989

[51] Int. Cl.$^4$ .............................................. G01V 3/30
[52] U.S. Cl. ...................................... 324/338; 175/40
[58] Field of Search ............................ 324/338–343, 324/356, 369; 175/40, 50

[56] References Cited

U.S. PATENT DOCUMENTS

| | | |
|---|---|---|
| 2,719,363 | 10/1955 | Montgomery et al. |
| 4,292,588 | 9/1981 | Smith. |
| 4,292,589 | 9/1981 | Bonner. |
| 4,297,699 | 10/1981 | Fowler et al. |
| 4,300,098 | 11/1981 | Huchital et al. |
| 4,546,314 | 10/1985 | Minerbo et al. |
| 4,546,315 | 10/1985 | Minerbo et al. |
| 4,661,933 | 4/1987 | Seeman et al. |
| 4,665,511 | 5/1987 | Rodney et al. |
| 4,791,797 | 12/1988 | Paske et al. |

OTHER PUBLICATIONS

SPE Paper No. 115, presented at the 36th Annual Fall Meeting of SPE-AIME, Oct. 8-11, 1961, "Evaluation Of Casing Corrosion By Means Of An Electromagnetic Casing Inspection Well Logging Device", by: Stanley G. Stroud and Charles A. Fuller.

SPE Paper No. 664, presented at the 38th Annual Fall Meeting of SPE-AIME, Oct. 6-9, 1963, "A Report On Field Results Of The Electromagnetic Casing Inspection Log", by: J. M. Edwards and S. G. Stroud.

SPE Paper No. 1327, presented at the 36th Annual California Regional Fall Meeting of SPE-AIME, Nov. 4-5, 1965, "New Electronic Casing Caliper Log Introduced For Corrosion Detection", by: J. M. Edwards and S. G. Stroud.

Paper presented at: 17th Annual Conference, Nat'l Asso. of Corrosion Engineers, Mar. 13-17, 1961-"The Casing Inspection Tool-An Instrument For The In-Situ Detection Of External casing . . . " by: T. R. Schmidt.

*Primary Examiner*—Reinhard J. Eisenzopf
*Assistant Examiner*—Walter E. Snow
*Attorney, Agent, or Firm*—Stephen L. Borst; John J. Ryberg

[57] ABSTRACT

A method is proposed for determining the distance from an investigating device to the surface of a medium capable of supporting wave propagation. According to the method, a propagatory wave is generated at a given location along the surface of said medium and spaced laterally therefrom. The propagatory wave is caused to enter the medium and to propagate in the medium. The phase of the propagating signal is detected at a pair of locations respectively spaced longitudinally along the surface of the medium by different distances from the transmitting location. An indication of the lateral spacing between the detecting means and the medium is determined in response to the phase information detected at the pair of locations.

13 Claims, 3 Drawing Sheets

METHOD FOR DETERMINING CHARACTERISTICS OF THE INTERIOR GEOMETRY OF A WELLBORE

BACKGROUND OF THE INVENTION

The present invention relates to apparatus and methods for determining the distance between an investigating device and the surface of a medium. More specifically, the invention may be used to determine the internal size of a subsurface open or uncased borehole or, more specifically, to determine the standoff distance between a borehole wall and a tool in the borehole such as a wireline logging sonde or a measurement while drilling (MWD) drill collar.

One of the parameters useful in the investigation of a subsurface geological formation and the borehole penetrating it is the borehole diameter. In the past, with wireline logging, it has been satisfactory to determine the borehole size by a physical device, such as by means of a borehole caliper having at least one extendible arm that is brought to bear against the borehole wall. U.S. Pat. No. 2,719,363 discloses one attempt to perform borehole size measurements from a drill string. In this approach, however, the caliper would only be enabled during the process of tripping out of the well in a manner not too dis-similar from the wireline. In the past, it has not been considered possible to make borehole size determinations with mechanical devices while drilling (as opposed to while tripping) due to the rather severe physical environment to which the measurement while drilling instruments are subjected. So severe is this environment, that one would not expect a physically extendible arm that reaches out and contacts the borehole wall while the drilling process is in progress, to survive.

In another approach, illustrated by U.S. Pat. Nos. 4,661,933, and 4,665,511 an ultrasonic pulse echo technique has been proposed while in yet another approach described in U.S. Pat. No. 4,791,797, measurements from a gamma ray density investigation and a neutron porosity investigation are combined with knowledge of the lithology to obtain a caliper measurement.

Also known are techniques which inspect the interior of a metallic pipe such as are described in U.S. Pat. Nos. 4,292,588, 4,292,589, 4,546,314, and 4,546,315. These and similar metallic casing inspection techniques are discussed in the following literature references:

SPE Paper No 115 presented at the 36th Annual Fall Meeting of the SPE-AIME, Oct. 8-11, 1961—"Evaluation of Casing Corrosion by Means of An Electromagnetic Casing Inspection Well Logging Device", by: Stanley G. Stroud and Charles A. Fuller SPE Paper No. 664 presented at the 38th Annual Fall Meeting of the SPE-AIME, Nov. 4-5, 1965—"A Report on Field Results of the Electromagnetic Casing Inspection Log", by: J. M. Edwards and S. G. Stroud SPE Paper No. 1327 presented at the 36th Annual California Regional Fall Meeting of the SPE-AIME, Nov. 4-5, 1965—"New Electronic Casing Caliper Log Introduced for Corrosion Detection", by: J. M. Edwards and S. G. Stroud Paper presented at the 17th Annual Conference of The National Association of Corrosion Engineers, Mar. 13-17, 1961—"The Casing Inspection Tool—An Instrument for the In-Situ Detection of External Casing Corrosion in Oil Wells", by: T. R. Schmidt Recent developments in the industry of subsurface investigations, however, have begun to require that the borehole diameter measurements be performed while the well is being drilled. In many instances it is desireable to know the size of the borehole in order to be able to assess such quantities as borehole size and tool standoff which may have a number of deleterious effects on the various investigations. Additionally, knowledge of the size of the borehole contemporaneous with drilling would be of substantial assistance to the driller as it would give him an indication of the stability of the borehole.

At least one ultrasonic pulse echo investigation has been proposed for implementation during the drilling process. The above mentioned U.S. Pat. No. 4,665,511 describes an ultrasonic device intended for this purpose. Ultrasonics are, however, faced with a number of difficulties such as signal scatter from the drill cuttings in the borehole, severe signal attenuation in heavy drilling muds and a backscattered signal that "misses" when the face of the transceiver is not parallel to the tangent of the surface of the hole.

Thus, a reliable, accurate determination of the diameter of a borehole while the borehole is being drilled is sorely needed in the field of subsurface drilling and exploration.

SUMMARY OF THE INVENTION

In the present invention a method is proposed for determining the distance from an investigating device to the surface of a medium capable of propagating waves. According to the method, a propagatory wave is generated at a given location along the surface of said medium and spaced laterally therefrom. The propagatory wave is caused to enter the medium and to propagate in the medium. The phase of the propagating signal is detected at a pair of locations respectively spaced longitudinally along the surface of the medium by different distances from the transmitting location. An indication of the lateral spacing between the detecting means and the medium is determined in response to the phase information detected at the pair of locations.

More specifically, this invention relates to a method and apparatus for measuring the diameter of a wellbore using an electromagnetic tool during wireline logging or logging-while-drilling. An electromagnetic wave is generated at a transmitting antenna located on the circumference of a logging device, and is detected by two or more similar receiving antennas spaced longitudinally from the transmitter.

During the operation of such a tool, the transmitted electromagnetic wave travels radially through the borehole and enters the formation. The wave then travels in the formation parallel to the borehole wall and then re-enters the borehole to travel radially to reach the receivers. As a result of this path, the phase of the signal at a receiver (with respect to the phase of the signal at the transmitter) contains information about the borehole fluid, about the borehole diameter, and about the formation. The phase shift (and/or attenuation) measured between the receivers depends primarily on the formation resistivity. This phase shift in conjunction with the phase at one or more receivers enables the separation of the effects of the borehole from the effects of the formation on the phase at a receiver. The borehole effects are directly related to the borehole diameter and the resistivity of the fluid in the borehole. Since the resistivity of the fluid in the borehole is ordinarily known or may be easily measured, one can deduce the borehole diameter.

BRIEF DESCRIPTIONS OF THE DRAWINGS

The invention will now be described with reference to the accompanying drawings:

FIG. 1 graphically illustrates an investigating apparatus having a transmitter and a pair of receivers spaced from a medium and useful for determining the lateral distance between the apparatus and the medium.

DESCRIPTION OF THE PREFERRED EMBODIMENT

Figure 1:
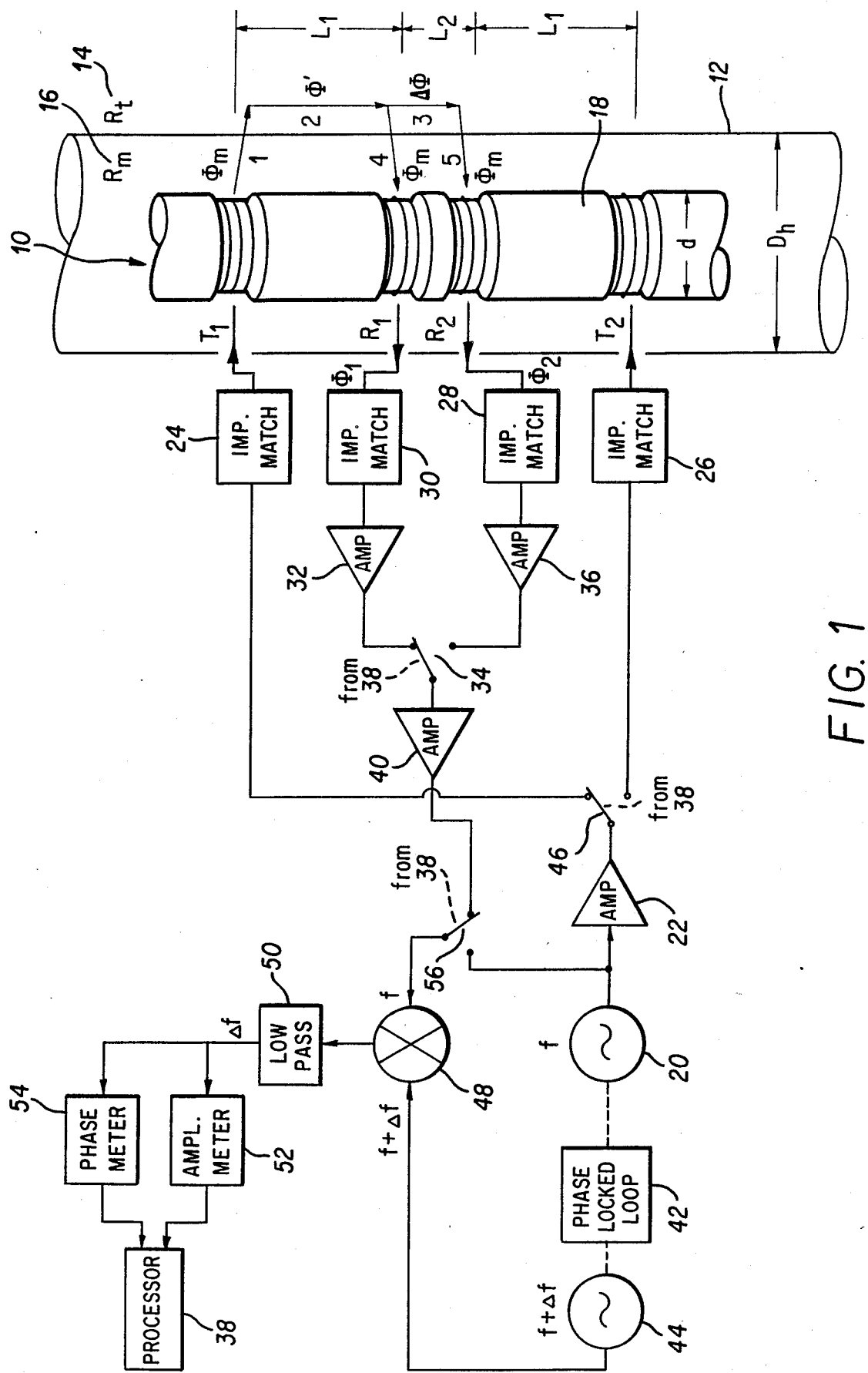

Referring to FIG. 1, an electromagnetic logging tool 10 of diameter d is shown in a borehole 12 of diameter $D_h$, traversing a formation 14 of resistivity $R_t$. The borehole 12 is filled with drilling fluid or mud 16 of resistivity $R_m$. The logging tool 10 consists of a mandrel 18 generally centrally located in the borehole 12. Mandrel 18 carries two longitudinally spaced transmitting antennas T1 and T2 which straddle a pair of receiving antennas R1 and R2. In the preferred embodiment, antennas T1, and T2 and receiving antennas R1, R2 are electromagnetic antennas designed to function in the neighborhood of 2 Mhz. Other embodiments are feasable such as an acoustic embodiment with sonic or ultra sonic transmitters and receivers.

FIG. 1 is a block diagram of the electronics in the tool 10 including the acquisition and processor electronics. An oscillator 20 produces an electrical signal of frequency (f), which is amplified by amplifier 22 and alternately applied to the transmitting antennas T1 and T2 via processor 38 controlled switch 46 and impedance matching circuits 24 and 26. The signal from receiver R1 is coupled via impedance matching circuit 30 and preamplifier 32 to one input of an electronically controlled switch 34. Similarly, the signal from receiver R2 is coupled via impedance matching circuit 28 and preamplifier 36 to the other input of the switch 34. The switch 34, under control of processor 38, selects the output of receiver (R1) or (R2). The selected signal is amplified by amplifier 40. The processor controlled switch 56 selects either the amplified receiver signals or a reference signal from the master oscillator 20. The reference signal from the master oscillator is used to measure the phase of the signal at a transmitter.

The selected signal is subsequentally translated to a lower frequency using a known heterodyne technique. A local oscillator 44 is in a phase locked loop 42 with the master oscillator 20. The local oscillator 44 has a frequency $(f+\Delta f)$ a few kilohertz (or less) incrementally different from the master oscillator. A signal from the local oscillator is mixed with the received signal by a mixer 48, and the mixer output is passed through a low pass filter 50 which passes signals only at the incremental frequency $(\Delta f)$. The signal at the incremental frequency contains the phase and amplitude information of the original signal. The recognized advantage of this frequency translation is that it is easier to measure the phase and amplitude at kilohertz or lower frequencies than at megahertz frequencies. The signal at the incremental frequency is measured with a phase meter 54 and with an amplitude meter 52, and the results are input to the processor 38. The phase meter 54 may utilize a reference signal from the phase locked loop 42. The phase and amplitude meters may also include sample-and-hold circuits, to implement comparison of the signal form the respective receivers. In this regard, reference can be made, for example, to U.S. Pat. No. 4,185,238, assigned to the same assignee as the present application. Alternatively, the processor may compute the relative phase and amplitude from the measurements it receives. For a more thorough and complete description of the tool 10, reference may be had to commonly assigned U.S. application Ser. No. 115,503 entitled "Well Logging Apparatus and Method" filed Oct. 30, 1987, the disclosure of which is hereby incorporated by reference.

During the operation of tool 10, the transmitter (T1) broadcasts an electromagnetic signal, and the signal is received at the uphole receiver (R1) and the downhole receiver (R2). The phases of these two signals are designated $\Phi_1$, and $\Phi_2$, respectively. The phase shift between the receivers is $$\Delta\Phi=\Phi_2-\Phi_1. \tag{1}$$

Figure 2:
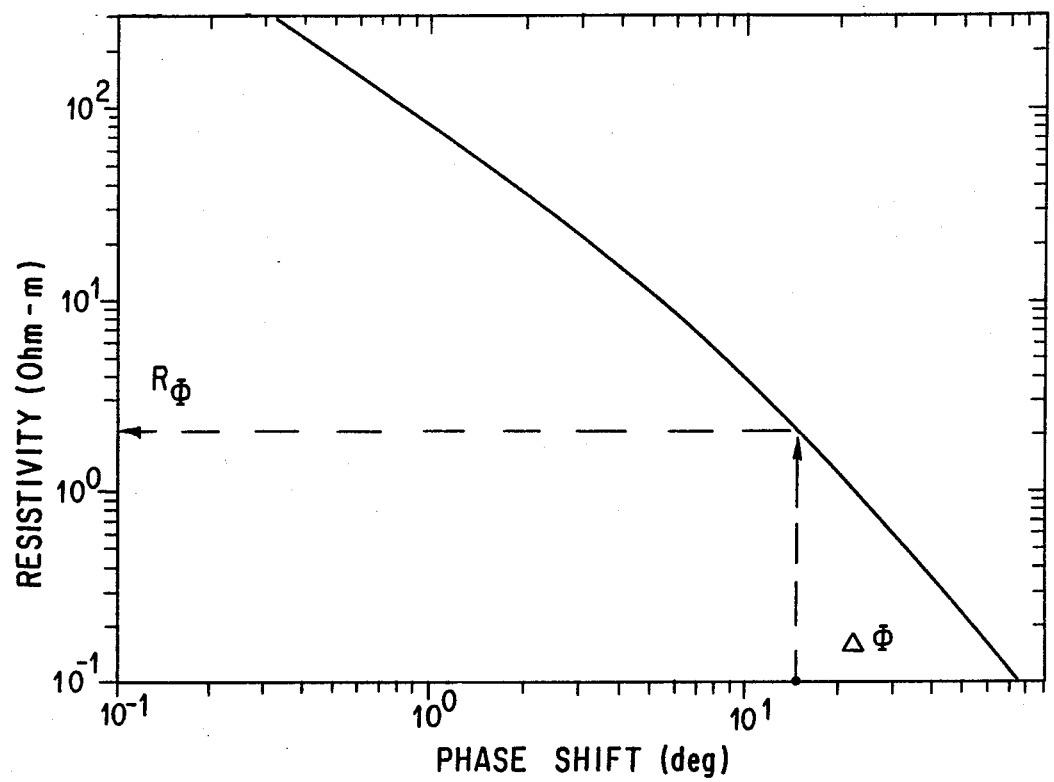
FIG. 2 is a graph representative of a look-up table for obtaining apparent resistivity from a phase shift measurement.

As described in the above referenced patent application, the resistivity of the formation can be determined from a graph such as that which is shown in FIG. 2 or by means of a mathematical formula for apparent formation resistivity ($R_\Phi$) expressed in terms of $\Delta\Phi$, such as a polynomial expression. The exemplary graph of FIG. 2 was prepared for a logging while drilling logging tool incorporated in a 6.5" outside diameter drill collar, operating at 2 Mhz.

Typical borehole diameters and moderate mud resistivities do not have large effects on $\Delta\Phi$ and $R_\Phi$, so that an accurate and reliable formation resistivity, $R_\Phi$, between the two receivers R1 and R2 may be obtained. Laboratory experiments and theoretical models reported in "Electromagnetic Propagation Logging While Drilling: Theory and Experiment", B. Clark et. al, SPE paper 18117, 63rd Annual Technical Conference, Oct. 2-5, 1988, verify this result. The insensitivity of $\Delta\Phi$ to borehole size and to the drilling mud resistivity, $R_m$, can be understood from a simple ray model used to illustrate the wave propagation. In FIG. 1, the approximately radial rays labelled 1, 4, and 5 represent radial propagation between the tool and the formation. As such rays traverse the drilling mud filled borehole, their phases are strongly affected by the borehole so that the phase evolution, $\Phi_m$, along such rays depends strongly on the resistivity of the drilling mud, $R_m$, and on $D_h$, the diameter of the borehole. The approximately vertical rays labelled 2 and 3 correspond to propagation in the formation. The phase evolution along these rays, $\Phi'$ and $\Delta\Phi$, depends primarily on the resistivity of the formation, $R_t$. The phases at R1 and R2 can be written as $$\Phi_1 = 2\Phi_m + \Phi' + \Phi_0, \quad (2)$$

and $$\Phi_2 = 2\Phi_m + \Phi' + \Delta\Phi + \Phi_0, \quad (3)$$

where $\Phi_0$ is the phase of the signal at the transmitting antenna, and is a tool constant. In obtaining the apparent resistivity of the formation, one subtracts $\Phi_1$ from $\Phi_2$ and all terms except $\Delta\Phi$ cancel with the result that the borehole effects are largely eliminated.

By the same reasoning, it can be seen that rays 1, 4, and 5 are strongly affected by $R_m$ and $D_h$, and that information about the borehole diameter is contained in the phase evolution term $\Phi_m$. The quantity $\Phi_m$ is functionally related to $(D_h - d)$, the difference between the borehole and tool diameters, and to the contrast between the mud resistivity and the formation resistivity, typically with the relationship $(1/R_m - 1/R_t)$. Because the tool diameter, mud resistivity, and formation resistivity are known or measureable, the borehole diameter $D_h$ can be deduced from $\Phi_m$.

The quantity $\Phi_m$ can be derived from $\Phi_1$, $\Phi_2$, and from a calibration procedure. In order to obtain $\Phi_m$, it is useful to define the "total phase" as twice the sum of the phases of the received signals at the receivers, $$\Phi_T = 2(\Phi_1 + \Phi_2), \quad (4a)$$

or, upon substituting equation 2 and 3 into equation 4a, $$\Phi_T = 2(4\Phi_m + 2\Phi' + \Delta\Phi + 2\Phi_0). \quad (4b)$$

In equation 4b, $\Phi_T$ and $\Delta\Phi$ are known from equations 1 and 4a; $\Phi'$ can be estimated from $\Delta\Phi$; and $\Phi_0$ can be obtained from a calibration procedure. Because $\Delta\Phi$ and $\Phi'$ correspond to wave propagation in the formation, they are functionally related. The simplest approximation for this relationship is $\Phi' \approx (L_1/L_2)\Delta\Phi$, where $L_1$ is the distance from the transmitter (T1) to the near receiver (R1), and where $L_2$ is the distance between the two receivers (R1 and R2). With this approximation for $\Phi'$, $$\Phi_T \approx 2(4\Phi_m + (2L_1/L_2 + 1)\Delta\Phi + 2\Phi_0). \quad (5)$$

$\Phi_0$ is a tool related constant that depends on the phase of the master oscillator, and on the details of the tool electronics and antennas. $\Phi_0$ can be obtained by calibrating the tool in a known medium, such as in a water-filled tank, and by measuring the phase of the master oscillator, as described above. Equation 5 can then be solved to give $\Phi_m$. The borehole diameter can be estimated from $\Phi_m$ and from an appropriate mathematical model relating $\Phi_m$ to $(D_h - d)$ and $(1/R_m - 1/R_t)$.

Figure 3:
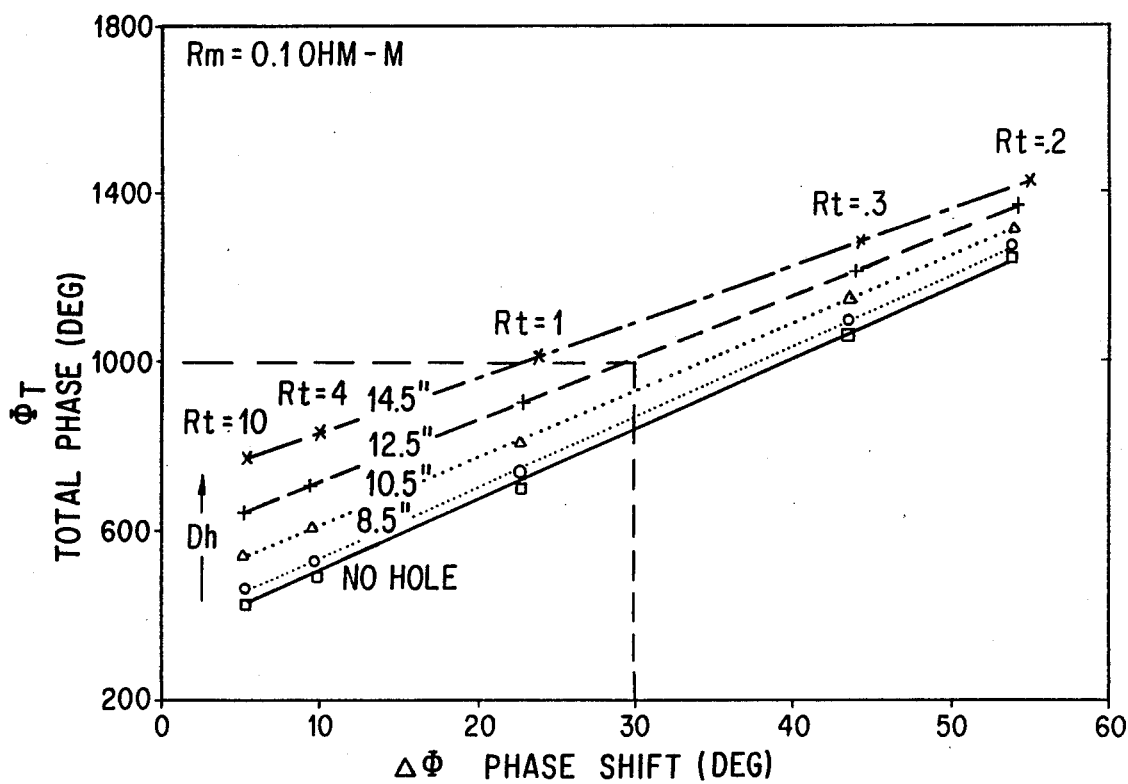
FIG. 3 is a graph representative of a look-up table for obtaining the borehole diameter from phase shift and total phase measurements in a borehole containing 0.1 ohm-m mud.

Alternatively, a theoretical model can be used to relate the total phase $(\Phi_T)$, the phase shift $(\Delta\Phi)$, the mud resistivity $(R_m)$, and the formation resistivity $(R_t)$ to the borehole diameter $(D_h)$. For example, FIG. 3 shows a theoretically derived relationship between $\Phi_T$ and $\Delta\Phi$ for several borehole sizes with $R_m = 0.1$ $\Omega$m, for a drill collar with an outer diameter of 6.5". The line labelled "NO HOLE" is the tool response calculated without a borehole. The lines labelled 8.5", 10.5", 12.5", and 14.5" represent different values for $D_h$. For constant $D_h$ and $R_m$, $\Phi_T$ is generally proportional to $\Delta\Phi$, also predicted by equation (5). For a fixed value of $\Delta\Phi$, $\Phi_T$ is generally proportional to $(D_h - d)$. Since $R_m$ is always less than $R_t$ in this chart, $\Phi_T$ increases as $D_h$ increases. In practice, the borehole diameter can be obtained by entering this chart with measured values for $\Delta\Phi$ and $\Phi_T$. For example, if $\Delta\Phi = 30°$ and $\Phi_T = 1000°$, then $D_h = 11.8"$.

Figure 4:
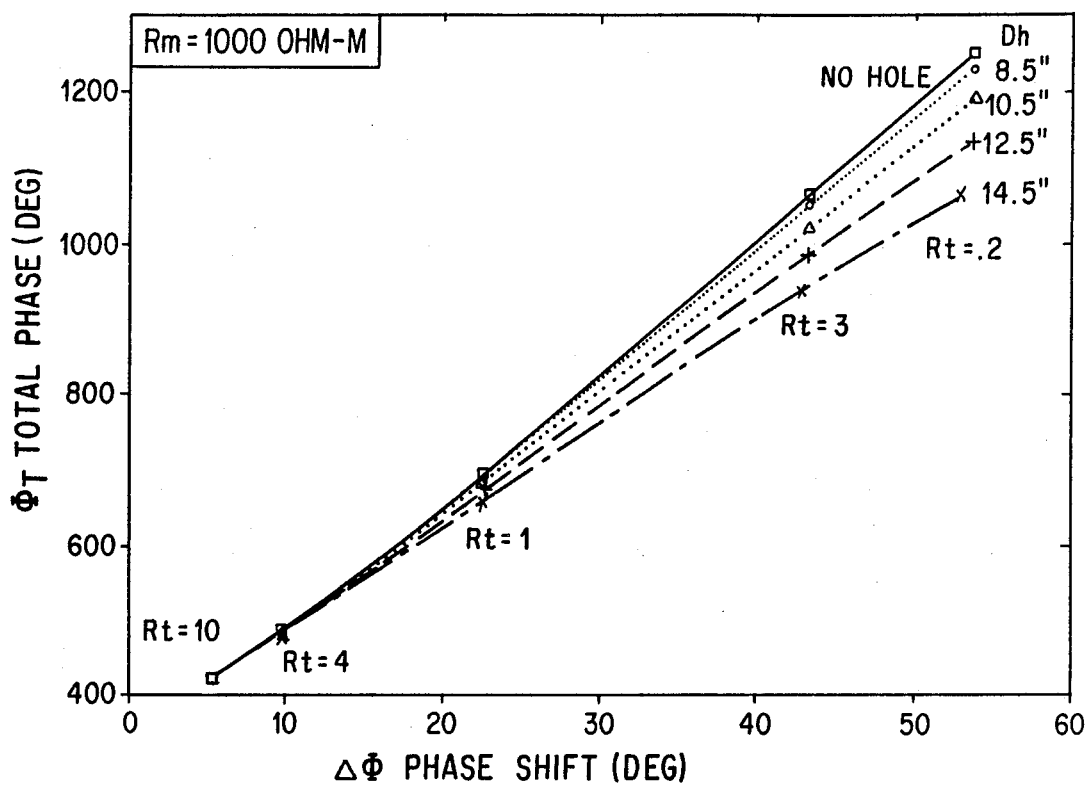
FIG. 4 is a graph representative of a look-up table for obtaining borehole diameter from phase shift and total phase measurements in a borehole containing 1000 ohm-m mud.

FIG. 4 shows a similar theoretically derived relationship between $\Phi_T$ and $\Delta\Phi$ for several borehole sizes with $R_m = 1000$ $\Omega$m. Since $R_m$ is always greater than $R_t$ in this chart, $\Phi_T$ decreases as $D_h$ increases. The borehole diameter is obtained as before by entering the chart with $\Delta\Phi$ and $\Phi_T$. In the special situation where $R_m = R_t$, there is no contrast between the formation and the mud, and the borehole diameter cannot be obtained. However, this situation is generally rare.

Another approach for obtaining the borehole diameter is by deriving a set of equations which relates $D_h$ to $\Delta\Phi$, $\Phi_T$, $R_m$, and possibly also to $R_t$. Such a set of equations can be derived from theoretical modelling, from laboratory experiments, or from log examples. For example, $\Phi_T$ and $\Delta\Phi$ could be measured in laboratory experiments using a plastic tube containing water to simulate the borehole, and a large water-filled test tank to simulate the formation. By systematically varying the water resistivities inside and outside of the plastic tube, one can determine the relationships between $\Phi_T$, $\Delta\Phi$, $D_h$, $R_m$, and $R_t$. The following empirical equation has been found for a 6.5" diameter tool operating in resistive muds (when $R_m > 0.8$ $\Omega$m), $$\Phi_T \approx (A - 43/R_m + 0.47/R_m^2) + (4 + 5.5/R_m - 0.05/R_m^2)D_h + (17.6 + 0.14D_h - 0.029D_h^2)\Delta\Phi. \quad (6)$$

The constant A is related to the phase of the signal at the transmitting antenna, that is, to $\Phi_0$. The constant A can be obtained with a calibration procedure, in a similar manner as $\Phi_0$.

The value of $D_h$ thus obtained may be plotted versus depth to comprise an electromagnetic caliper log. This electromagnetic caliper log can be used in real time to assist the driller in identifying borehole stability problems which manifest themselves in borehole diameters that are greater than bit gauge for sloughing or collapsing formations and in diameters that are less than bit gauge in swelling formations. Where such problems are identified while the well is being drilled, the driller can take steps to prevent further degradation of the wellbore and prevent possible loss of the drill string or of the well.

Additionally, the electromagnetic caliper log of this invention which is obtained as the well is being drilled may be compared to the caliper obtained from a wireline caliper. The wireline caliper is typically a mechanical measurement having one (or more) moveable arms, which measures the borehole diameter along one (or more) axes. Because the electromagnetic caliper log averages over the entire borehole volume, there can be some differences between electromagnetic and mechanical calipers in a rugose borehole, which is unlikely to be round. Nevertheless, where the differences are gross, one can expect the differences to arise from further borehole modification between the time that the well is drilled and the time that well is logged by the wireline technique which may be as short as two or three days later or as long as two or three weeks later.

Figure 5:
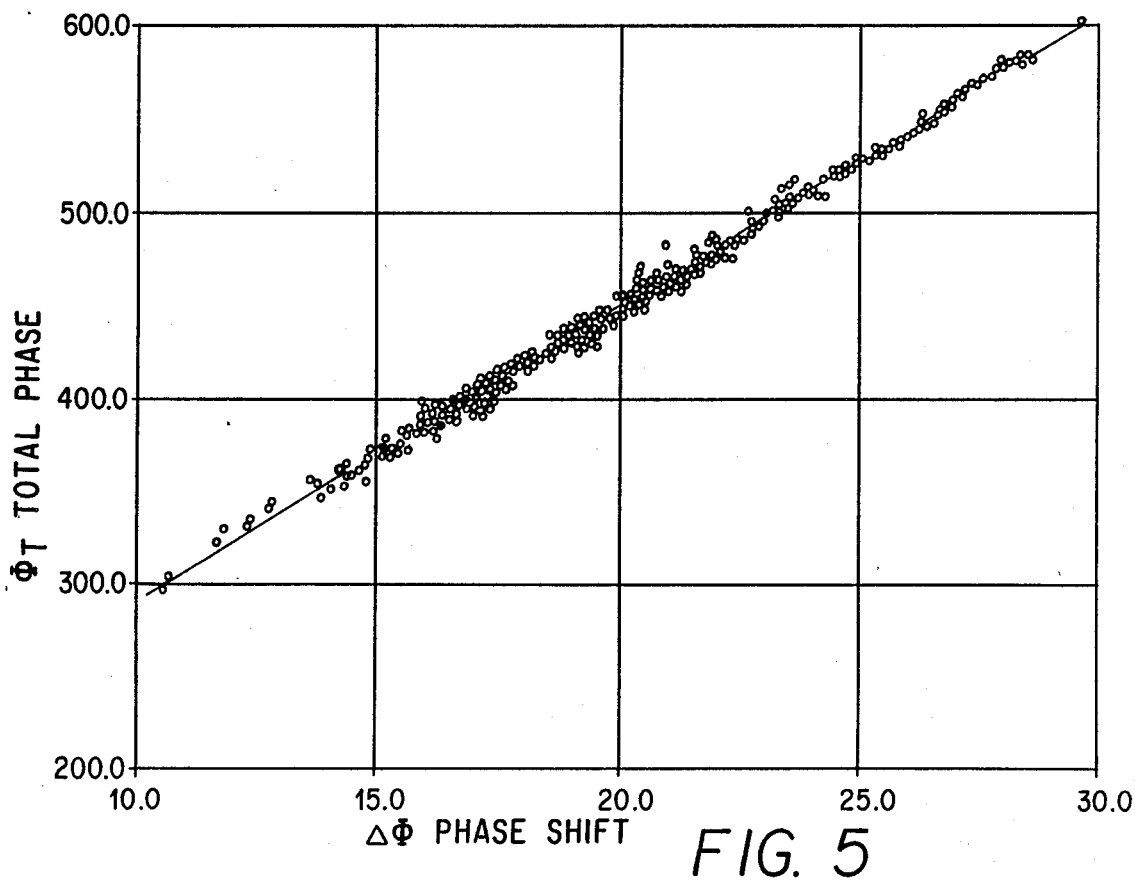
FIG. 5 is a cross-plot of total phase versus phase shift using data from a well drilled with oil based mud. The invention will now be described with reference to the accompanying drawings.

If desired, caliper measurements of this invention may be obtained at different times. Comparison of such caliper logs obtained at different times is useful for determining the borehole condition of portions higher in the well as the lower portions are being drilled. Additional information about the general state of the borehole can also be derived from a simple cross-plot of $\Phi_T$ versus $\Delta\Phi$, such as shown in FIG. 5. The observation that the data cluster near a straight line is sufficient to determine that the borehole is smooth and in guage. In an enlarged or rugose borehole, a similar cross-plot will show significant scatter about a line. Thus, a simple cross-plotting technique can be used to determine the general state of the borehole. Cross-plotting can also be used to determine the value for the constant A needed in equation (6). This cross-plotting technique provides a downhole calibration procedure.

The electromagnetic caliper log of this invention may also be utilized to improve the measurement accuracy of such other formation properties as resistivity, natural radioactivity, neutron porosity, etc. Most logging sensors are degraded by rugose or enlarged boreholes. For example, an MWD tool designed to measure natural radioactivity is adversely affected by a washout, because a radioactive formation is farther from the sensor than expected when the measurement is made. A caliper measurement can be used to correct the sensor response in an enlarged borehole.

One may also improve the formation resistivity measurement by using $\Phi_T$ directly, without solving for the borehole diameter. Referring again to FIG. 3, it can be seen that the lines of constant $R_t$ are not strictly vertical. Therefore, deriving apparent resistivity from $\Delta\Phi$ alone can result in errors in large boreholes. The conventional approach is to use a borehole correction chart in conjunction with bit size and $R_m$ as explained in "A Dual Depth Resistivity Measurement for FEWD", B. Clark et al, 29$^{th}$ Annual Logging Symposium Transactions of the SPWLA, Paper A, June 5-8, 1988, San Antonia, Tex. However, the chart in FIG. 3 may be entered with $\Delta\Phi$ and $\Phi_T$ to automatically produce a value for apparent resistivity which accounts for the actual borehole size.

While preferred embodiments have been shown and described, various modifications and substitutions may be made thereto without departing from the spirit and scope of the invention. For example, the principles of the present invention may equally as well be applied to a technique in which an acoustic signal comprises the propagatory signal and the acoustic velocity is utilized to characterize the properties of the borehole fluid. Accordingly, it is to be understood that the present invention has been described by way of illustration and not limitation.

What is claimed is:

1. A method for investigating characteristics of the interior geometry of a fluid filled passage formed through a medium, said passage having therein a transmitter and a pair of receivers spaced different distances along said passage from said transmitter, comprising the steps of:
   a. generating an oscillating signal at said transmitter such that said oscillating signal properties into and through said medium to said receivers;
   b. generating a first signal indicative of the phase evolution of said oscillating signal as it propagates from said transmitter to said receivers, said phase evolution including components attributable to traversal of a portion of said passage and components attributable to traversal of said medium between said transmitter and said receivers;
   c. generating a second signal indicative of a property of said medium; and
   d. in response to said first and second signals, generating a signal indicative of the interior geometry of said passage.

2. The method as recited in claim 1 wherein said step of generating a second signal indicative of a property of said medium includes determining the phase of said oscillatory signal at each of said receivers and generating a signal indicative of the phase shift of said oscillatory signal between said receivers.

3. The method as recited in claim 2 further including the step of generating a signal indicative of the resistivity of said medium in response to said phase shift signal.

4. The method as recited in claim 1 wherein said step of generating a signal indicative of the interior geometry of said passage includes the step of combining said first and second signals to produce a third signal which is independent of that component of phase evolution of said oscillatory signal attributable to traversal of said medium between said transmitter and said receivers.

5. The method as recited in claim 1 further including the step of determining an electrical property of the fluid filling said passage and wherein said step of generating a signal indicative of the interior geometry of said passage is further responsive to said electrical property determination.

6. The method as recited in claim 1 wherein said transmitter is an electromagnetic energy transmitting antenna and said pair of receivers is a pair of electromagnetic energy receiving antennas.

7. The method as recited in claim 1 wherein said medium is a subsurface geological formation, said passage is a borehole drilled through said formation, and said transmitter and said receivers are mounted on a borehole logging sonde.

8. The method as recited in claim 7 wherein said borehole logging sonde is incorporated in a drill collar and said method is performed while the borehole is being drilled and said characteristic of the interior geometry of a fluid filled passage includes the diameter of the borehole.

9. The method as recited in claim 7 further including the step of cross plotting said first and second signals as an indication of the general state of the borehole.

10. The method as recited in claim 8 wherein said signal indicative of the interior geometry of said passage is a signal indicative of borehole diaeter and is provided to the driller of the borehole while the borehole is being drilled as an indication of the stability of the borehole.

11. The method as recited in claim 8 further including the step of comparing said borehole diameter to borehole diameter measurements obtained at different times as an indication of borehole change.

12. A method for determining the diameter of a borehole penetrating a subsurface geological formation, said borehole containing a fluid having a predetermined resistivity, comprising the steps of:
   a. transmitting a propagatory electromagnetic signal at a transmitting antenna positioned at a given location on a drill collar;
   b. detecting the phase shift of the propagating signal between a pair of locations respectively spaced different longitudinal distances from said transmitting antenna along the surface of said drill collar and generating a signal indicative thereof;
   c. determining a phase signal indicative of the phase of a received signal relative to that of said transmitted signal at the transmitter;

d. in response to said predetermined resistivity of said fluid in said borehole, to said phase signal and to said phase shift signal, generating a signal indicative of the size of said borehole.

13. A method for investigating a characteristic property of a medium through which a fluid filled passage is formed, said passage having therein a transmitter and a pair of receivers spaced different distances along said passage from said transmitter, comprising the steps of:
   a. generating an oscillating signal at said transmitter such that said oscillating signal propagates into and through said medium to said receivers;
   g. generating a first signal indicative of the phase evolution of said oscillating signal as it propagates from said transmitter to said receivers, said phase evolution including a component attributable to traversal of a portion of said passage and a component attributable of said medium between said transmitter and said receivers;
   c. generating a second signal indicative of the difference in phase of said oscillating signal between said pair of receivers; and
   d. in response to said first and second signals, generating a signal indicative of said medium's characteristics property substantially independent of the effects of said oscillating signal's traversal of a portion of said passage.

* * * * *